(12) United States Patent
Nakirikanti et al.

(10) Patent No.: US 11,674,814 B2
(45) Date of Patent: *Jun. 13, 2023

(54) IDENTIFICATION, CLASSIFICATION, AND USE OF ACCIDENT-PRONE ZONES FOR IMPROVED DRIVING AND NAVIGATION

(71) Applicant: Verizon Patent and Licensing Inc., Basking Ridge, NJ (US)

(72) Inventors: Anil Nakirikanti, Atlanta, GA (US); Thomas George Ancheriyil, Sandy Springs, GA (US); Anjjan Sathia Narayan, Sandy Springs, CO (US); Lakshmi N. Chakarapani, Sandy Springs, GA (US); Kapilan Baskar, Atlanta, GA (US); Chaewon L. Min, Duluth, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 150 days.

This patent is subject to a terminal disclaimer.

(21) Appl. No.: 17/249,656

(22) Filed: Mar. 9, 2021

(65) Prior Publication Data
US 2021/0190520 A1    Jun. 24, 2021

Related U.S. Application Data

(63) Continuation of application No. 16/130,724, filed on Sep. 13, 2018, now Pat. No. 10,955,254.

(51) Int. Cl.
G08G 1/123      (2006.01)
G01C 21/34      (2006.01)
(Continued)

(52) U.S. Cl.
CPC ......... *G01C 21/3461* (2013.01); *G06F 16/29* (2019.01); *H04W 4/021* (2013.01); *H04W 4/44* (2018.02)

(58) Field of Classification Search
CPC ... G01C 21/3461; G06F 16/29; G06F 16/909; G06F 16/906; H04W 4/021; H04W 4/44; G08G 1/123
(Continued)

(56) References Cited

U.S. PATENT DOCUMENTS 10,955,254 B2 *   3/2021  Nakirikanti ............. H04W 4/44
2007/0260363 A1 * 11/2007  Miller .................... G08G 1/205
                                                    701/2

(Continued)

*Primary Examiner* — Shardul D Patel

(57) ABSTRACT

A device can obtain historical accident data identifying accidents within a geographic region. The device can classify geographic areas within the geographic region as being sparse accident-prone zones (APZs) or dense APZs by processing the historical accident data using a clustering technique and clustering parameters. The device can generate data identifying geographic boundaries of the sparse APZs and the dense APZs. The device can provide the data identifying the geographic boundaries to be stored using a data structure. The device can receive telematics data associated with a vehicle within the geographic region. The device can determine whether the vehicle is in or approaching a particular APZ based on whether a location of the vehicle is within the particular APZ or based on whether the vehicle is likely to enter the particular APZ. The device can provide an alert to the vehicle or a user device associated with the vehicle.

20 Claims, 7 Drawing Sheets

(51) Int. Cl.
*H04W 4/44* (2018.01)
*H04W 4/021* (2018.01)
*G06F 16/29* (2019.01)

(58) Field of Classification Search
USPC .......................................................... 701/532
See application file for complete search history.

(56) References Cited

U.S. PATENT DOCUMENTS

| | | | |
|---|---|---|---|
| 2011/0238304 A1* | 9/2011 | Kendall | G01C 21/3492 |
| | | | 701/532 |
| 2013/0162425 A1* | 6/2013 | Raghunathan | G08B 23/00 |
| | | | 340/517 |
| 2016/0236638 A1 | 8/2016 | Lavie et al. | |
| 2018/0299284 A1 | 10/2018 | Wang | |
| 2019/0353499 A1* | 11/2019 | Stenneth | G06V 20/56 |
| 2020/0090510 A1 | 3/2020 | Nagarajan et al. | |

* cited by examiner

IDENTIFICATION, CLASSIFICATION, AND USE OF ACCIDENT-PRONE ZONES FOR IMPROVED DRIVING AND NAVIGATION

RELATED APPLICATION

This application is a continuation of U.S. patent application Ser. No. 16/130,724, entitled "IDENTIFICATION, CLASSIFICATION, AND USE OF ACCIDENT-PRONE ZONES FOR IMPROVED DRIVING AND NAVIGATION," filed Sep. 13, 2018 (now U.S. Pat. No. 10,955,254), which is incorporated herein by reference in its entirety.

BACKGROUND

Telematics is an interdisciplinary field that encompasses telecommunications, vehicular technologies, road transportation, road safety, and/or the like. For example, vehicle telematics can involve one or more systems and/or processes designed to improve road safety for drivers.

DETAILED DESCRIPTION OF PREFERRED EMBODIMENTS

Figure 1A:
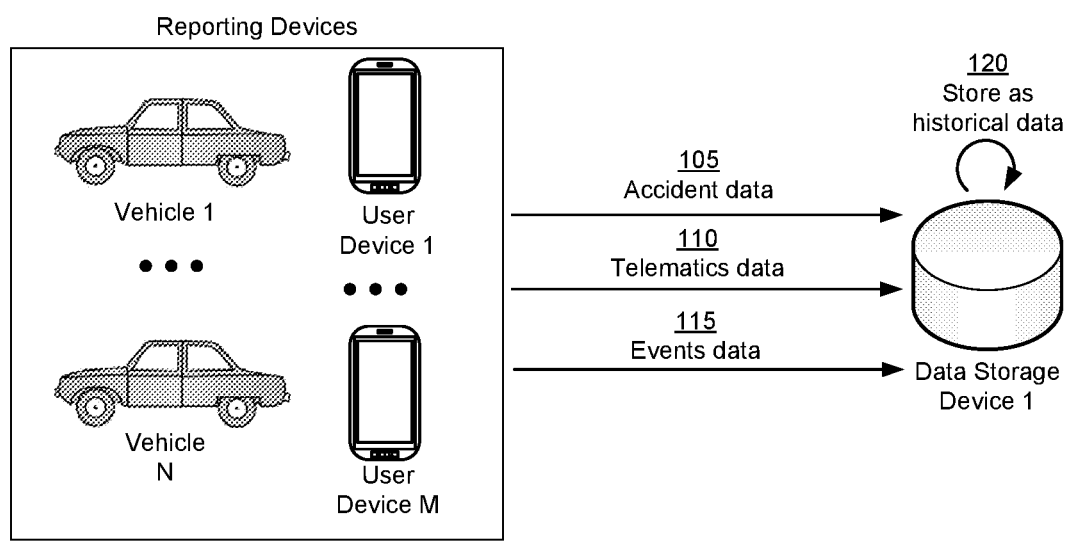
FIGS. 1A-1D are diagrams of an example implementation described herein.

The following detailed description of example implementations refers to the accompanying drawings. The same reference numbers in different drawings can identify the same or similar elements.

The automotive industry has transformed from an industry that provides transportation services exclusively to an industry that also provides communication and/or entertainment services. In many cases, a vehicle is provisioned with a telematics unit that provides wireless communication. As such, a driver and/or a passenger within the vehicle can use the telematics unit to access communication and/or entertainment services (e.g., by interacting with a mobile phone in the vehicle, an in-vehicle dashboard, and/or the like).

In some cases, a telematics unit of a vehicle can provide the location of the vehicle to a telematics call center, which can enable services, such as stolen vehicle tracking, automatic crash notifications, route navigation services, and/or the like. However, there is no service available to intelligently identify accident-prone zones and to notify vehicles when the vehicles are approaching the accident-prone zones. Without a service to identify and notify vehicles of accident-prone zones, the vehicles that drive through the accident-prone zones are more likely to get into an accident.

Furthermore, driving through an accident-prone zone can cause the vehicle and/or a user device within the vehicle to waste resources (e.g., fuel, processing and/or network resources of components of the vehicle or a user device within the vehicle, and/or the like). For example, a vehicle can waste fuel by traveling through an accident-prone zone if the vehicle is stuck in the accident-prone zone as a result of an accident, can waste processing resources and/or network resources used to provide in-vehicle navigational services (e.g., by calculating a route through an accident-prone zone, then, after an accident occurs, having to re-calculate a new optimal route based on the accident), can waste processing resources and/or network resources used by the telematics unit to report an accident within the accident-prone zone, and/or the like.

Some implementations described herein provide a telematics management platform to generate and provide, to a vehicle or a user device associated with the vehicle, an alert indicating that the vehicle is in or approaching an accident-prone zone. For example, the telematics management platform can obtain historical accident data associated with accidents in a geographic region. In this case, the telematics management platform can perform multiple iterations of a clustering technique to identify and/or classify geographic areas within the geographic region as either sparse accident-prone zones or dense accident-prone zones. A sparse accident-prone zone, as used herein, can refer to a rural area, an area that satisfies a first threshold number of accidents, an area that satisfies a first set of clustering parameters (as defined further herein), and/or the like. A dense accident-prone zone, as used herein, can refer to an urban area, an area that satisfies a second threshold number of accidents (e.g., which might be a number of accidents that is greater than a number of accidents needed to satisfy the first threshold), an area that satisfies a second set of clustering parameters (as defined further herein), and/or the like. Additionally, the telematics management platform can generate data identifying geographic boundaries of the sparse accident-prone zones and the dense accident-prone zones and can provide the data to be stored using a data structure.

Furthermore, as vehicles are driving within the geographic region, telematics data can be provided to the telematics management platform. This can allow the telematics management platform to determine whether the vehicle is in or approaching a particular accident-prone zone (e.g., by referencing the data identifying to geographic boundaries of the sparse and dense accident-prone zones). Additionally, the telematics management platform can provide, to the vehicle or the user device associated with the vehicle, the alert indicating that the vehicle is approaching the accident-prone zone.

By providing the vehicle with an alert indicating that the vehicle is approaching the accident-prone zone, the telematics management platform enables the vehicle and/or the user device to efficiently and effectively utilize resources while reducing a likelihood of being in an accident. For example, providing the vehicle or the user device with the alert prior to the vehicle entering the accident-prone zone permits the vehicle to be routed away from the accident-prone zone. This conserves fuel resources that might otherwise be wasted due to traffic caused by an accident, conserves processing resources and/or network resources that might otherwise be used to perform actions within the accident-prone zone (e.g., re-calculate new navigational instructions based on an accident occurring, report an accident, and/or the like), and/or the like. Furthermore, by intelligently identifying and/or classifying the accident-prone zones (e.g., by performing multiple iterations of clustering on the historical accident data), the telematics management platform conserves processing resources and/or network resources relative to an inferior platform that might misidentify and/or misclassify accident-prone zones and expend resources sending out improper alerts.

FIGS. 1A-1D are diagrams of an example implementation 100 described herein. For example, example implementation 100 can include a group of reporting devices, a first data storage device, a second data storage device, and/or a telematics management platform. As shown herein, the telematics management platform can intelligently classify geographic areas within a geographic region as either sparse accident-prone zones or dense accident-prone zones. This can allow the telematics management platform to identify when vehicles are in or approaching an accident-prone zone, and to generate and provide, to the vehicles or user devices associated with the vehicles, alerts indicating that the vehicles are in or approaching the accident-prone zone.

As shown in FIG. 1A, the group of reporting devices can provide accident data, telematics data, and/or events data to the first data storage device. The group of reporting devices can include a group of vehicles, a group of user devices, and/or any other device that can report accident data and/or telematics data (e.g., sensors, cameras, and/or the like).

As shown by reference number 105, the group of reporting devices can provide accident data to the first data storage device. The accident data can include vehicle location data of a vehicle involved in an accident (e.g., geographic coordinates of the vehicle, such as a coordinates for latitude, longitude, altitude, and/or the like), data identifying a time of the accident, data identifying a direction in which the vehicle is traveling, telematics data associated with the vehicle at the time of the accident (as defined below), and/or the like.

In some implementations, the group of vehicles can detect accidents and can generate and report accident data for the accidents. For example, the group of vehicles can include a telematics unit that is configured to generate accident data when an accident occurs. In some cases, the telematics unit of the vehicle can detect an accident by monitoring for a threshold change in acceleration and/or speed of the vehicle. Once detected, the telematics unit can generate the accident data, and can use a communication interface to report the accident to the first data storage device.

Additionally, or alternatively, the group of user devices can report accident data. For example, a user within a vehicle that is in an accident can have a user device (e.g., a mobile phone) with an application that allows the user to report the accident, a user who sees an accident can report the accident with his or her user device, and/or the like. Additionally, or alternatively, a camera and/or a sensor in a vicinity near the accident can report the accident data. For example, a sensor located on a street near the accident can identify the accident and can provide image data and/or multimedia data of the accident to the first data storage device. In some cases, the sensor might provide the image data and/or the multimedia data to another data storage device (e.g., a publicly accessible data storage device), and the telematics management platform can query the other data storage device to obtain the image data and/or the multimedia data. This can allow the telematics management platform to analyze the image data and/or the multimedia data to generate accident data that can be provided to the first data storage device.

Additionally, or alternatively, accident data may be stored using another data storage device, such as a data storage device associated with open source accident data. For example, a server device may store open source accident data, such that the open source accident data may be obtained (e.g., queried) by other devices, such as the telematics management platform. In this case, when the telematics management platform obtains historical accident data from the first data storage device (as shown in reference number 125), the telematics management platform may also obtain the open source accident data from other data storage device (e.g., using an application programming interface (API)).

Additionally, or alternatively, and as shown by reference number 110, the group of reporting devices can provide telematics data to the first data storage device. The telematics data can include vehicle location data, directional data indicating a direction in which the vehicle is traveling, vehicle diagnostics data (e.g., data indicating a mileage counter, whether any vehicle warning indicators are present, and/or the like), and/or the like.

In some implementations, the group of vehicles can report the telematics data. For example, the telematics unit of the vehicles can be configured to generate telematics data periodically (e.g., after a threshold amount of time passes), when an accident is detected, and/or based on another type of trigger. In some implementations, to generate directional data, the telematics unit can include, or interact with, a global positioning system (GPS) unit that can detect a direction in which the vehicle is traveling. For example, the GPS unit can determine a first set of geographic coordinates at a first time period, a second set of geographic coordinates at a second time period, and can compare the first set of geographic coordinates and the second set of geographic coordinates to determine the direction in which the vehicle is traveling. In some implementations, to generate vehicle diagnostics data, the telematics unit can scan vehicle diagnostics, or request another component of the vehicle to scan vehicle diagnostics, such as by scanning whether any of the vehicle's warning indicators have been recently displayed on the in-vehicle dashboard.

Additionally, or alternatively, the group of user devices can report the telematics data. For example, a user device can include a GPS unit that is able to determine the direction in which the vehicle is traveling, in a manner similar to that described above.

Additionally, or alternatively, and as shown by reference number 115, the group of reporting devices can provide events data to the first data storage device. The events data can include time data, weather data, data identifying a popular event such as a sports match or a concert, and/or the like. The events data might influence whether a geographic area is an accident-prone zone, might influence geographic boundaries of an accident-prone zone, and/or the like. For example, an area might be an accident-prone zone during a particular time period (e.g., a time at which vehicle traffic is heavy), if particular weather conditions are present, and/or the like, as described further herein.

In some implementations, the group of reporting devices can report the events data. For example, a sensor associated with the vehicle (e.g., affixed to the vehicle, near the vehicle, etc.) can periodically capture weather data identifying a temperature, a wind speed, a humidity level, and/or the like, and can provide the weather data to the first data storage device.

Additionally, or alternatively, the telematics management platform can obtain events data from other data storage devices. For example, the telematics management platform can use an application programming interface (API) to obtain weather data from a web server that provides publicly accessible weather readings. In this case, the telematics management platform can provide the weather data to the first data storage device. As another example, the telematics management platform can perform one or more data mining techniques to analyze (e.g., crawl) one or more webpages that list times and locations of popular events such as sports matches, concerts, and/or the like. In this example, the telematics management platform can provide the data that has been mined to the first data storage device.

As shown by reference number 120, the first data storage device can store the accident data, the telematics data, and/or the events data as historical data. For example, the first data storage device can store the accident data and/or the telematics data as historical data using a linked-list, an array, a database (e.g., a relational database), a tree, a hash table, and/or the like.

In this way, the historical data can be stored by the first data storage device and referenced by the telematics management platform for further processing, as described further herein.

Figure 1B:
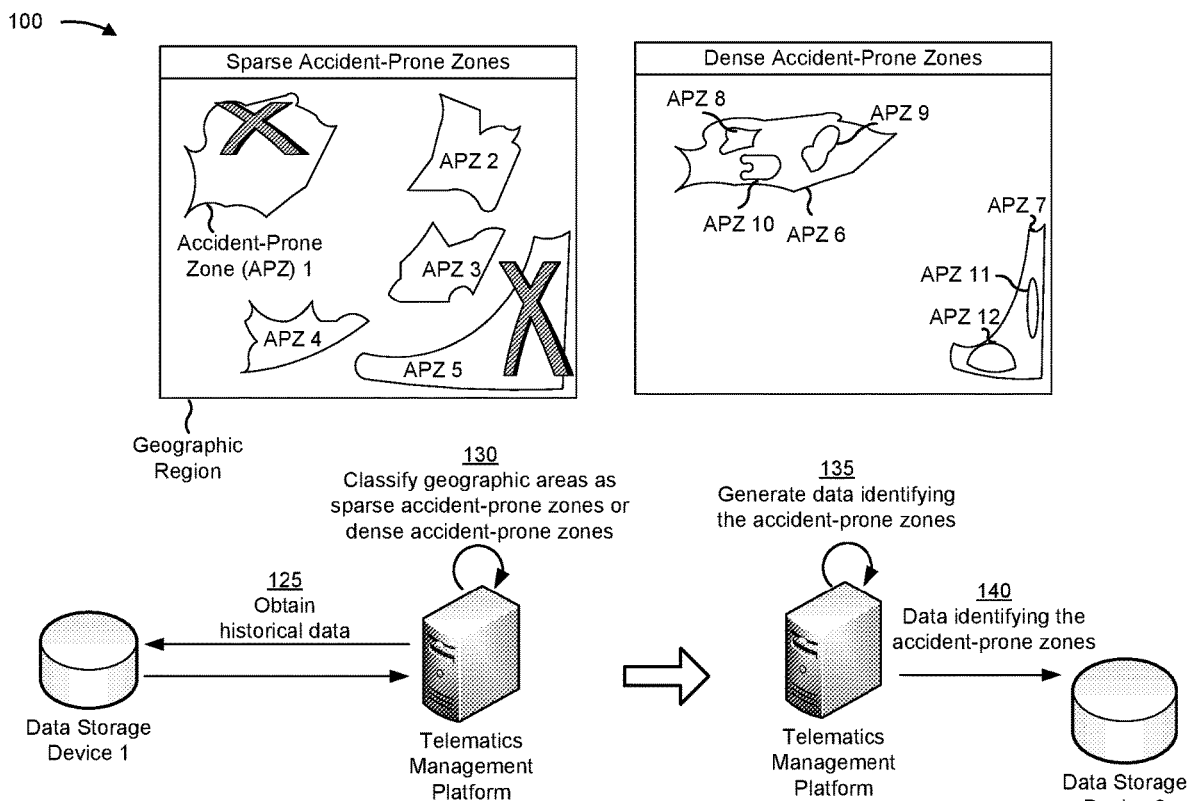

As shown in FIG. 1B, the telematics management platform can classify geographic areas as being accident-prone zones. Several examples below describe ways to classify the geographic areas as being accident-prone zones. It is to be understood that these are provided by way of example, and that in practice, one or more other techniques can be used to classify geographic areas as being accident-prone zones.

As shown by reference number 125, the telematics management platform can obtain, from the first data storage device, the historical data that is to be used to classify geographic areas within the geographic region as accident-prone zones. For example, the telematics management platform can use a search query to obtain the historical data from the first data storage device. In some implementations, the first data storage device can be configured to automatically provide the historical data to the telematics management platform (e.g., periodically over an interval).

As shown by reference number 130, the telematics management platform can classify geographic areas within the geographic region as accident-prone zones. For example, the telematics management platform can process the historical accident data using a clustering technique to identify and mark a set of geographic areas as accident-prone zones.

An accident-prone zone, as used herein, can refer to a geographic area that includes a threshold number of accidents (e.g., over a particular time period, within a certain proximity of each other, and/or the like). As such, when a vehicle is notified of an accident-prone zone, there might not be an actual accident occurring. Instead, the accident-prone zone might represent a threshold likelihood of an accident occurring (e.g., based on an area's history of accidents), such that a driver knows to take extra precautions while driving, avoid the accident-prone zone by adjusting navigational instructions used to reach a destination location, and/or the like. The geographic boundaries of the accident-prone zone can be identified using the clustering technique, as described below.

In some implementations, the telematics management platform can perform a clustering technique to identify the set of geographic areas as accident-prone zones. For example, the telematics management platform can perform a density-based spatial clustering of applications with noise (DBSCAN) technique to identify the set of geographic areas as accident-prone zones. Additionally, or alternatively, the telematics management platform can perform a different type of clustering technique than described herein. For example, the telematics management platform can perform a K-clustering technique, a kernel density estimation technique, and/or the like.

In some implementations, the telematics management platform can perform multiple iterations of clustering to identify a first group of geographic areas as sparse accident-prone zones and a second group of geographic areas as dense accident-prone zones. For example, the telematics management platform can use a first set of clustering parameters and the DB SCAN technique to perform a first iteration of clustering that identifies the first group of geographic areas as sparse accident-prone zones.

The first set of clustering parameters can define rules that are to be satisfied if a geographic area is to be identified as an accident-prone zone. For example, the first set of clustering parameters can include a first clustering parameter (e.g., a min points parameter) indicating a threshold number of accidents (e.g., a minimum number of accidents) that must have occurred within a geographic area for the geographic area to be an accident-prone zone (e.g., within a particular time period, such as an hour, four hours, 24 hours, and/or the like), a second clustering parameter (e.g., an epsilon parameter) indicating a threshold distance that has to be between accidents for the accidents to be considered part of the same accident-prone zone, and/or the like. As a particular example, assuming the first and second clustering parameter are both used, if accident A and accident B are within a threshold distance of each other (e.g., satisfying the second clustering parameter), accident A and accident B might be considered as part of an accident-prone zone if a threshold number of accidents occurred within a geographic area that includes the location of accident A and accident B (e.g., satisfying the first clustering parameter).

Continuing with the example, the first set of clustering parameters can be tuned to identify sparse areas as accident-prone zones. For example, the first clustering parameter can indicate a minimum number of accidents that must occur in a geographic area to identify the geographic area as an accident-prone zone. In some cases, a sparse area will be a rural area that typically has fewer accidents (e.g., on average) than a dense area, such as an urban area, as a result of less overall traffic. To account for this, the first clustering parameter can be set to a minimum number of accidents that is lower than a minimum number of accidents needed to satisfy a corresponding clustering parameter used to identify a dense accident-prone zone. A similar tuning can be performed for the second clustering parameter (e.g., by setting a threshold distance that is larger than a threshold distance used in a corresponding clustering parameter used to identify the dense accident-prone zone).

A consequence of this tuning is that the telematics management platform might falsely identify large dense areas as sparse accident-prone zones (e.g., because many dense areas are likely to have enough accidents to satisfy the lower minimum number of accidents described above). To address this consequence, the telematics management platform can identify the dense accident-prone zones using a second set of clustering parameters, which can allow the telematics management platform to identify an accurate list of sparse accident-prone zones (e.g., by removing the falsely identified dense accident-prone zones from the first group of geographic areas identified as sparse accident-prone zones), as further described below.

In some implementations, the telematics management platform can identify the second group of geographic areas as dense accident-prone zones. For example, the telematics management platform can perform a second iteration of clustering using a second set of clustering parameters and the DBSCAN to identify the second group of geographic areas as the dense accident-prone zones. The second set of clustering parameters can be tuned to identify accident-prone zones in dense areas by setting a minimum number of accidents needed for an area to be considered a dense accident-prone zone to a number that is higher than a number used by a corresponding clustering parameter used to identify sparse accident-prone zones, by setting a threshold distance value to a value lower than that used by a corresponding clustering parameter used to identify sparse accident-prone zones, and/or the like.

In some implementations, the telematics management platform can further refine the second group of geographic areas identified as dense accident-prone zones. For example, some geographic areas identified as dense accident-prone zones might not be prone to accidents (e.g., as a result of the second set of clustering parameters being tuned in a manner that identified areas near accident-prone zones as part of the accident-prone zones when these areas might not be prone to accident). In this case, the telematics management platform can perform a third iteration of clustering using a third set of clustering parameters and the DB SCAN to analyze the second group of geographic areas and to identify a subset of the second group of geographic areas as the dense accident-prone zones. The third set of clustering parameters can be tuned in a manner similar to that described above (e.g., such that certain areas within the second group of geographic areas would no longer satisfy the clustering parameters).

As shown as an example, the telematics management platform can perform the first iteration of clustering to identify accident-prone zone 1, accident-prone zone 2, accident-prone zone 3, accident-prone zone 4, and accident-prone zone 5 as sparse accident-prone zones (shown as Accident-Prone Zone (APZ) 1, APZ 2, APZ 3, APZ 4, and APZ 5). Additionally, the telematics management platform can perform the second iteration of clustering to identify accident-prone zone 6 and accident-prone zone 7 (shown as APZ 6 and APZ 7) as dense accident-prone zones. This can allow the telematics management platform to refine the list of sparse accident-prone zones by removing geographic areas associated with accident-prone zone 6 and accident-prone zone 7 (as shown by the red X marks), such that the list of sparse accident-prone zones includes accident-prone zone 2, accident-prone zone 3, accident-prone zone 4, and a subset of accident-prone zone 1 and accident-prone zone 5 (e.g., a subset that is not part of accident-prone zone 6 and/or accident-prone zone 7). Additionally, the telematics management platform can perform the third iteration of clustering to identify, as the refined list of dense accident-prone zones, accident-prone zone 8, accident-prone zone 9, accident-prone zone 10, accident-prone zone 11, and accident-prone zone 12 (shown as APZ 8, APZ 9, APZ 10, APZ 11, and APZ 12).

By performing multiple iterations of clustering, the telematics management platform improves overall accuracy of the identified accident-prone zones. This conserves processing resources and/or network resources relative to an inferior platform that might otherwise expend resources on incorrectly identifying areas as accident-prone zones.

As shown by reference number 135, the telematics management platform can generate data identifying the accident-prone zones. For example, the telematics management platform can generate data identifying geographic boundaries of the accident-prone zones (e.g., geographic coordinates identifying the geographic boundaries). As shown by reference number 140, the telematics management platform can provide the data identifying the accident-prone zones to the second data storage device.

In some implementations, the telematics management platform can use accident data for accidents that have occurred within a threshold time period. For example, if an accident has occurred after a threshold time period, the telematics management platform may not consider that accident when classifying the geographic areas as accident-prone zones. In some cases, the telematics management platform may periodically reclassify the geographic areas as accident-prone zones, such that accidents that occurred after the threshold time period are not considered. In this way, the telematics management platform ensures that the accident-prone zones are determined using updated and/or recent accident data.

In this way, the telematics management platform intelligently classifies geographic areas as sparse accident-prone zones or dense accident-prone zones.

Figure 1C:
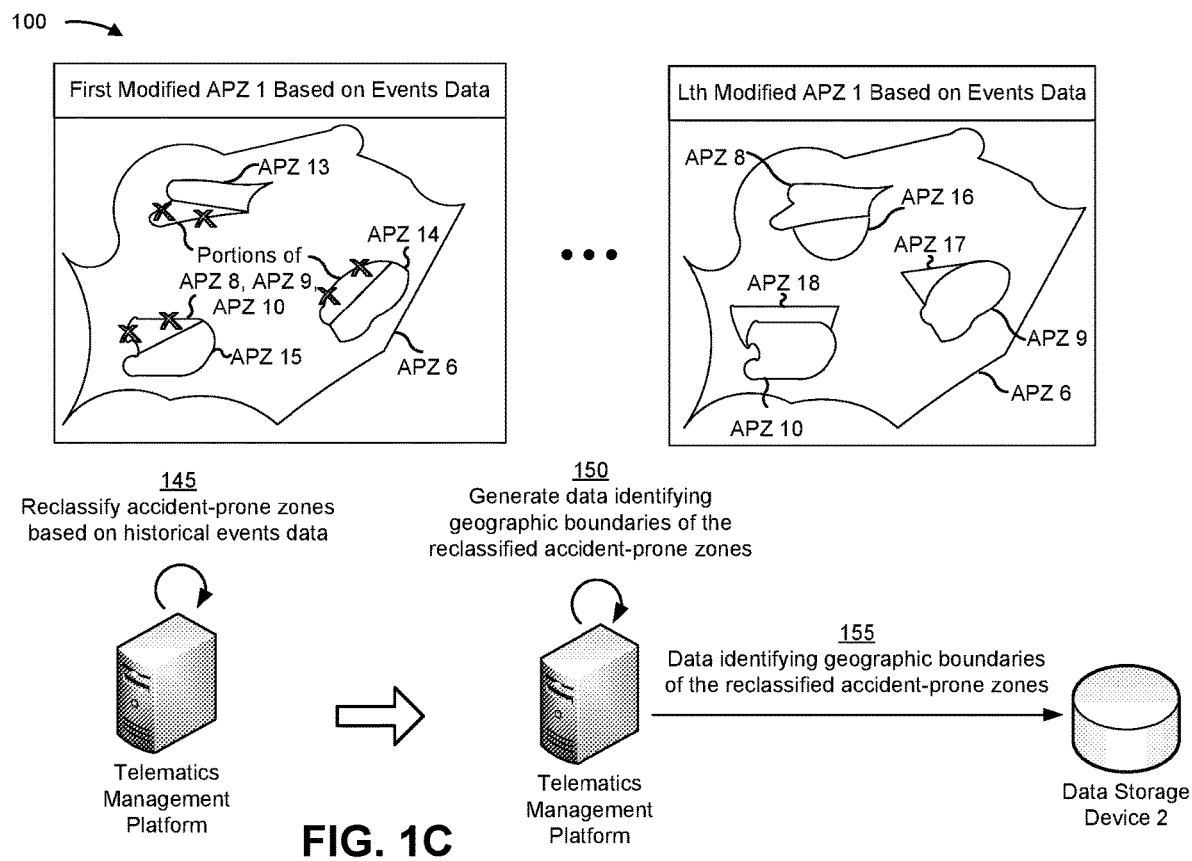

As shown in FIG. 1C, and by reference number 145, the telematics management platform can reclassify accident-prone zones based on the historical events data. For example, the geographic boundaries of the dense accident-prone zones and/or the sparse accident-prone zones can change based on a time of day (e.g., certain areas can be associated with higher volumes of traffic at particular time periods), based on weather (e.g., certain areas can be more likely, or less likely, to be part of an accident-prone zone depending on the weather), based on a popular event causing an influx in traffic in a certain area (e.g., a game for a professional sport, a show involving famous actors or musicians, and/or the like), and/or the like. In this case, the telematics management platform can analyze the historical events data to determine a set of accident indicators and can reclassify the dense accident-prone zones and/or the sparse accident-prone zones based on the presence of particular accident indicators, as further described below. Reclassifying, as used herein, can refer to classifying a new area as an accident-prone zone, modifying geographic boundaries of an area previously classified as an accident-prone zone, removing an area from an accident-prone zone, and/or the like.

In some implementations, the telematics management platform can determine a set of accident indicators that are to be used to reclassify the geographic areas identified as accident-prone zones. For example, the telematics management platform can analyze the historical events data to determine one or more trends (e.g., using a clustering technique, a trend analysis, a regression analysis, or a different type of technique) that can be used as indicators of whether an accident is more (or less) likely to occur.

The set of accident indicators can include a first accident indicator which indicates that a particular area is more (or less) likely to be part of an accident-prone zone at particular time periods (e.g., during rush hour when traffic is heavy), a second accident indicator which indicates that certain weather (e.g., snow, rain, ice, and/or the like) is likely to increase (or decrease) a likelihood of an area being part of an accident-prone zone (e.g., bad weather can increase a likelihood of all roads being accident-prone zones, of steep roads being accident-prone zones, and/or the like), a third accident indicator indicating that a time period at which an event (e.g., a sporting event, a social event, a music event, a theatrical event, etc.) is occurring increases a likelihood of an area being part of an accident-prone zone, and/or the like.

In some implementations, the telematics management platform can reclassify a geographic area as part of an accident-prone zone based on one or more accident indicators. For example, the telematics management platform can reclassify the geographic area as part of the accident-prone zone based on the whether one or more accident indicators are present at a particular time period. In this case, the telematics management platform can identify a time period at which one or more accident indicators are present and can reclassify geographic areas as accident-prone zones based on a likelihood of the accident indicators impacting whether the geographic areas will be accident-prone zones.

Figure 1D:
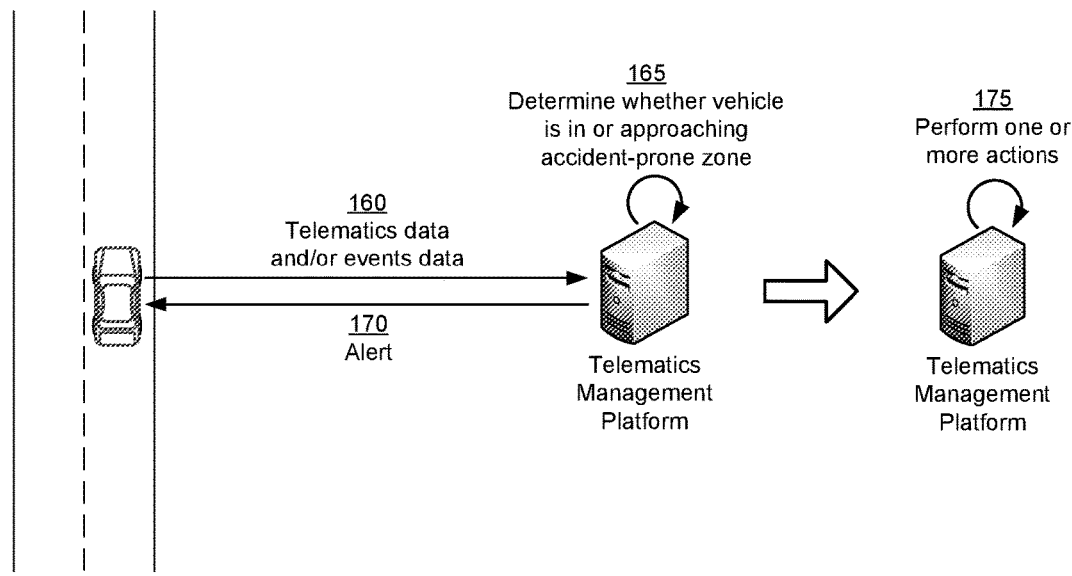

As shown as an example, the telematics management platform can use the accident indicators to determine that a first portion of APZ 8 is not an accident-prone zone at the first time period (e.g., as shown in FIG. 1D by the portion of APZ 8 with two red X marks). As such, the telematics management platform can classify a second portion of APZ 8 as the accident-prone zone during the first time period (shown as APZ 13). Conversely, the telematics management platform can use the accident indicators to determine that a geographic area outside of APZ 8 (shown as APZ 16) is to be included in the accident-prone zone at a second time period (e.g., a time period where vehicle traffic is high, such as rush hour).

While the example above illustrates classification (or declassification) of geographic areas based on time data, it is to be understood that this is provided by way of example. In practice, any number of different types of historical events data can be processed to determine any number of different types of accident indicators that can be used for classification of geographic areas as accident-prone zones or declassification of the geographic areas as no longer being part of the accident-prone zones.

In some implementations, the telematics management platform can use a trained machine learning model to make real-time classifications to an accident-prone zone. For example, the telematics management platform can train a machine learning model on the historical data, such that the one or more trends described above are able to be used to predict which geographic areas are more (or less) likely to be accident-prone zones. In this case, real-time data (e.g., telematics data, accident data, and/or events data) can be provided to the telematics management platform (e.g., from a vehicle driving around in the geographic region, from a user device within the vehicle, and/or the like). Additionally, the telematics management platform can provide the real-time data as input to the machine learning model to cause the machine learning model to output classifications for one or more accident-prone zones. This may allow the telematics management platform to process a location of the vehicle and geographic boundaries of the one or more accident-prone zones to determine whether the vehicle is in or approaching a particular accident-prone zone.

As shown by reference number 150, the telematics management platform can generate data identifying geographic boundaries of the reclassified accident-prone zones. For example, the telematics management platform can generate data identifying the geographic boundaries for the accident-prone zones for particular time periods based on the presence of particular events during the particular time periods. As such, the geographic boundaries of an accident-prone zone might be different depending on how many events are occurring at the accident-prone zone at a particular time period.

As shown by reference number 155, the telematics management platform can provide, to the second data storage device, the data identifying the geographic boundaries of the reclassified accident-prone zones. In this case, the second data storage device can store the data in association with relevant historical data used to generate the geographic boundaries (e.g., time data, particular events that occurred at a particular time period, and/or the like).

In this way, the telematics management platform can reference the data to determine whether vehicles are within or approaching particular accident-prone zones, as described further herein.

As shown in FIG. 1D, the telematics management platform can receive telematics data and/or events data associated with a vehicle driving within the geographic region and can determine whether the vehicle is in or approaching an accident-prone zone. As shown by reference number 160, the telematics management platform can receive telematics data and/or events data associated with the vehicle that is driving within the geographic region. For example, the telematics management platform can receive telematics data from the vehicle and/or a user device within the vehicle, as described elsewhere herein.

Additionally, or alternatively, the telematics management platform can receive events data from the vehicle, the user device associated with the vehicle, and/or another type of device (e.g., a sensor capable of detecting weather, etc.), as described elsewhere herein. The events data can relate to a particular geographic area in which the vehicle is driving. In some cases, such as when the telematics management platform obtains events data from another data source (e.g., the web server that provides publicly accessible weather data), the telematics management platform can obtain the events data based on receiving the telematics data from the vehicle (or from the user device associated with the vehicle).

As shown by reference number 165, the telematics management platform can determine whether the vehicle is in or approaching the accident-prone zone. For example, the telematics management platform can process the telematics data to identify the vehicle location data and can use the vehicle location data as part of a search query that can be used to search the second data storage device to determine whether the vehicle's location is within an accident-prone zone.

In some implementations, the telematics management platform can use the telematics data and the events data to determine whether the vehicle is in or approaching the accident-prone zone. For example, the telematics management platform can process the telematics data to identify time data indicating a time at which the telematics data was generated or received. In this case, the telematics management platform can use the vehicle location data, the time data, and/or the events data as part of a search query to search the second data storage device for one or more accident-prone zones that are within a threshold range of the vehicle. Additionally, the telematics management platform can compare the data identifying the geographic boundaries of the one or more accident-prone zones to the vehicle location data to determine whether the vehicle is in or approaching an accident-prone zone.

As an example, assume the first data storage device stores data identifying a first copy of an accident-prone zone that has a first group of geographic boundaries that are based on events data values indicating that poor weather is present (e.g., icy roads). Additionally, the first data storage device stores data identifying a second copy of the accident-prone zone that has a second group of geographic boundaries that are based on events data values indicating that good weather is present (e.g., clear skies). Further assume the events data reported to the telematics management platform indicates that poor weather is present. As such, the telematics management platform can use a search query that includes the events data to obtain the data identifying the first copy of the accident-prone zone. In this case, the telematics management platform can process the vehicle location data and the data identifying the first group of geographic boundaries of the accident-prone zone to determine whether the vehicle is in or approaching the accident-prone zone.

In some cases, the search query can be configured such that the search query returns only an indicator of whether the vehicle's location is within an accident-prone zone. As such, the telematics management platform conserves processing resources that would otherwise be expended comparing data identifying geographic boundaries of accident-prone zones to vehicle location data of the vehicle.

As shown by reference number 170, the telematics management platform can provide, to the vehicle or the user device associated with the vehicle, an alert indicating that the vehicle is in or approaching the accident-prone zone. For example, the telematics management platform can use a communication interface (e.g., an API, an interface used to send short messaging service (SMS) messages, and/or the like) to provide the alert to the vehicle or the user device within the vehicle.

By providing the vehicle with an alert indicating that the vehicle is in or approaching the accident-prone zone, the telematics management platform enables the vehicle and/or the user device to efficiently and effectively utilize resources while reducing traffic within the accident-prone zone and reducing a likelihood of being in an accident.

As shown by reference number 175, the telematics management platform can perform one or more actions after determining whether the vehicle is in or approaching the accident-prone zone. For example, the telematics management platform can perform a first group of actions associated with assisting the vehicle in leaving or avoiding the accident-prone zone and/or can perform a second group of actions associated with improving safety within the accident-prone zone.

In some implementations, the telematics management platform can generate instructions identifying actions that can be performed by the vehicle. For example, the telematics management platform can generate instructions identifying that a vehicle should modify current vehicle speed, modify a route to avoid the accident-prone zone, and/or the like. In some implementations, the telematics management platform can provide the instructions identifying the actions to the vehicle. This can allow a driver to perform the actions, such as by slowing down the vehicle, altering the route of the vehicle to avoid the accident-prone zone, and/or the like. In some implementations, rather than simply provide instructions to modify a speed or modify a route to avoid the accident-prone zone, the telematics management platform might cause a GPS unit of the vehicle to automatically launch and display the navigational instructions for the user. In some implementations, the vehicle can be an autonomous vehicle, in which case the autonomous vehicle can be configured to automatically modify the vehicle speed and/or the route based on receiving the instructions from the telematics management platform.

Additionally, or alternatively, the telematics management platform can use the data identifying the accident-prone zones to enhance road network data. For example, the telematics management platform can use thresholds to classify roads based on a number of accidents that have occurred on the roads (e.g., a road can be classified as high-risk, medium risk, low-risk, and/or the like). This may allow a vehicle (e.g., which may be using a GPS unit for navigation) traveling within or near an accident-prone zone to identify a safest-path by identifying a road that has a safest-available classification (e.g., a low-risk road).

Additionally, or alternatively, the telematics management platform can generate instructions to modify a state of a traffic light within the accident-prone zone. For example, the telematics management platform can generate instructions to modify the state of a traffic light within a path of the vehicle to expedite routing the vehicle (and other vehicles) away from the accident-prone zone. In some implementations, the telematics management platform can provide the instructions to modify the state of the traffic light to a traffic control device.

Additionally, or alternatively, the telematics management platform can generate recommended time intervals to permit traffic to flow in a particular direction. For example, the telematics management platform can generate recommended time intervals to permit traffic flow in a particular direction to assist an individual that is managing traffic at an intersection, such as a police officer, a construction worker, a crosswalk employee of a school, and/or the like. In this case, the telematics management platform can provide the recommended time intervals to a device accessible to the individual managing the traffic at the intersection (e.g., a mobile device or another type of device).

By performing the first group of actions, the telematics management platform conserves fuel resources that might otherwise be wasted when the vehicle gets delayed by traffic within the accident-prone zone, conserves processing resources and/or network resources that might otherwise be used to perform actions within the accident-prone zone (e.g., re-calculate new navigational instructions based on an accident occurring, report an accident, and/or the like), improves efficiency in traffic flow within the accident-prone zone, reduces chances of accidents, and/or the like.

Additionally, or alternatively, the telematics management platform can generate recommended road maintenance that can be performed within the accident-prone zone. For example, the telematics management platform can generate a recommendation to repair a pothole in a road, to add a guard rail to a dangerous road, to add a stop sign to an intersection, to add a new sign to alert drivers that the area is an accident-prone zone, and/or the like. In some implementations, the telematics management platform can provide the recommended road maintenance to a device associated with a state department that manages roads and transportation, to a device associated with a commercial service provider that works on roads and transportation, and/or the like.

As an example, the telematics management platform can generate a recommendation to repair a pothole in a road. In this example, the telematics data or the events data can have included a screenshot of a pothole in a road that was captured by a sensor. As such, the telematics management platform can be able to provide, as part of the recommendation, the recommendation to repair the pothole, the location of the pothole, the size of the pothole, and/or the like.

As another example, the telematics management platform can generate and provide a recommendation to repair a road to an autonomous maintenance vehicle. Similar to the example above, the recommendation can include the location of the repair, can identify what needs to be repaired (e.g., including a size of what needs to be repaired), can identify tools needed to perform the repair, and/or the like. As such, the autonomous vehicle can automatically drive to the location based on receiving the recommendation and can process the information included in the recommendation to automatically perform the repair (e.g., a microprocessor might interact with one or more mechanical devices within the autonomous maintenance vehicle that are capable of repairing roads by adding cement to fill potholes).

Additionally, or alternatively, the telematics management platform can generate a recommendation to install a sensor at an accident-prone zone. For example, the telematics management platform can identify a location that has a threshold number of accidents, and can generate a recommendation to install a sensor at the location to capture vehicle speeds (e.g., to automatically issue speeding tickets and/or deter speeding), to identify accidents (e.g., which then be automatically reported to nearby police officers and/or medical professionals), and/or the like. In some implementations, the telematics management platform can provide the recommendation to the device associated with the state department that manages roads and transportation and/or to a device associated with the commercial service provider that is capable of installing sensors (e.g., a commercial service provider with a location near the point of installation).

Additionally, or alternatively, the telematics management platform can generate a recommendation to place a police vehicle at a particular location within the accident-prone zone (e.g., to deter vehicles from speeding, to be available with an accident occurs, and/or the like). In this case, the telematics management platform can provide the recommendation to the device associated with a police station that is within a threshold distance of the particular location. In some cases, the telematics management platform can provide the recommendation to an autonomous police vehicle that is able to automatically drive to the particular based on receiving the recommendation.

Additionally, or alternatively, the telematics management platform can generate a recommendation to station a drone at an accident-prone zone to capture video footage and/or images. In this case, the telematics management platform can provide the recommendation to the drone or a device associated with the drone, such that the drone is able to process to the recommendation and fly to the accident-prone zone to capture video footage and/or images.

In some implementations, one or more actions described above can be performed based on a trigger. For example, the telematics management platform can be configured with one or more threshold values that, if satisfied, cause the telematics management platform to perform an action. As an example, the telematics management platform can be configured to generate instructions to have a vehicle slow down if the vehicle is already inside the accident-prone zone, if the vehicle is approaching the accident-prone zone, if the vehicle is approaching the accident-prone zone and other accident indicators (e.g., poor weather) are present, and/or the like.

Similar triggers can be configured for other actions. For example, accident data might include data identifying a cause of accidents. As such, the telematics management platform might be configured such that if a threshold number of accidents are reported with the same accident cause (e.g., a pothole), an action can be automatically performed (e.g., generate and provide a recommendation to perform road maintenance to repair the pothole).

By performing the second group of actions, the telematics management platform orchestrates road maintenance that can improve efficiency in traffic flow within the accident-prone zone, reduce chances of accidents (e.g., as a result of the road maintenance, by deterring speeding, and/or the like), conserve resources of the vehicle and/or the user device (e.g., that might otherwise be expended to handle situations relating to accidents), improve police and medical response time to accidents, and/or the like.

In this way, the telematics management platform determines whether the vehicle is in or approaching the accident-prone zone, performs actions to assist the vehicle in leaving or avoiding the accident-prone zone, and/or performs actions to improve safety within the accident-prone zone.

As indicated above, FIGS. 1A-1D are provided merely as an example. Other examples are possible and can differ from what was described with regard to FIGS. 1A-1D. For example, there can be additional devices and/or networks, fewer devices and/or networks, different devices and/or networks, or differently arranged devices and/or networks than those shown in FIGS. 1A-1D. Furthermore, two or more devices shown in FIGS. 1A-1D can be implemented within a single device, or a single device shown in FIGS. 1A-1D can be implemented as multiple, distributed devices. Additionally, or alternatively, a set of devices (e.g., one or more devices) of example implementations 100 can perform one or more functions described as being performed by another set of devices of example implementations 100.

Figure 2:
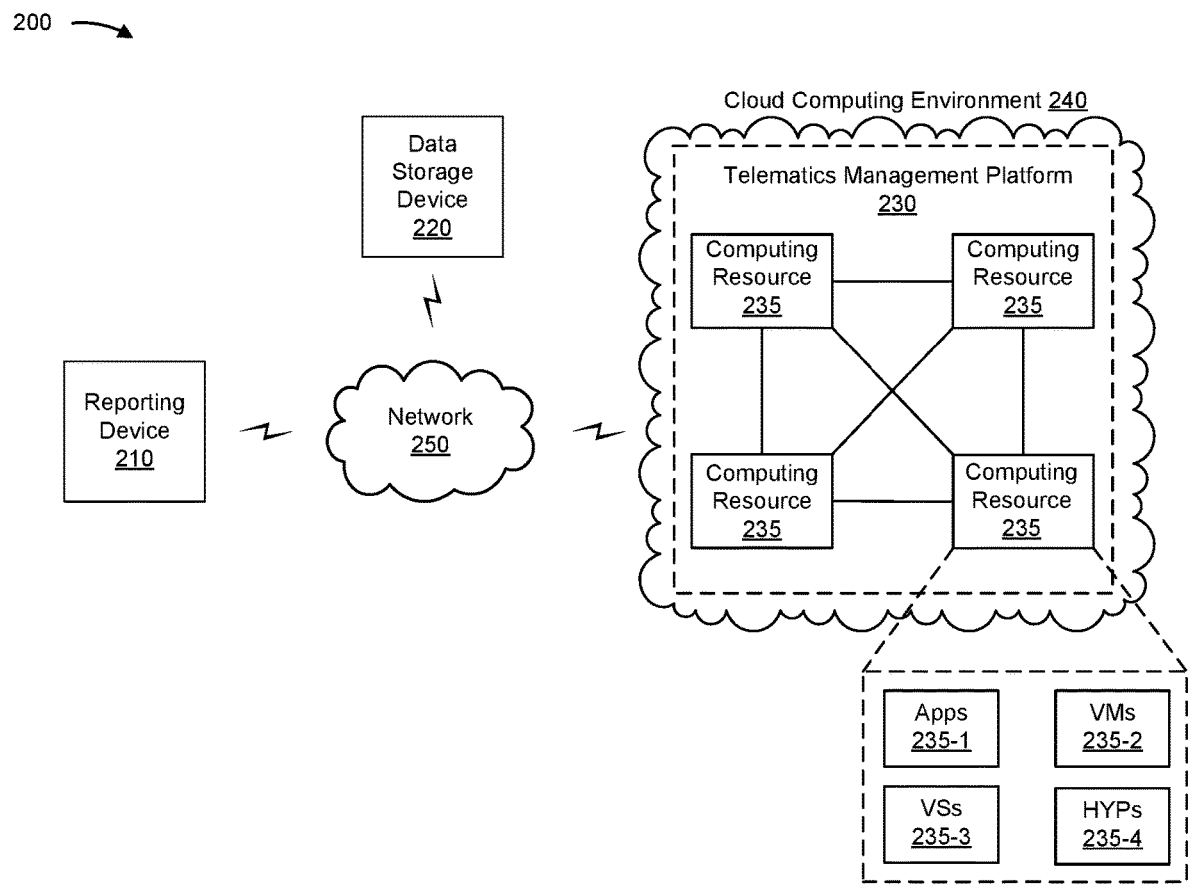
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a reporting device 210, a data storage device 220, a telematics management platform 230 hosted within a cloud computing environment 240, and/or a network 250. Devices of environment 200 can interconnect via wired connections, wireless connections, or a combination of wired and wireless connections.

Reporting device 210 includes one or more device capable of obtaining, storing, and/or providing information associated with accident-prone zones. In some implementations, reporting device 210 can be a vehicle (e.g., a car, a truck, a boat, a plane, a ship, a drone, an autonomous vehicle, and/or the like), a user device (e.g., a communication device, such as a mobile phone), a device with a sensor (e.g., capable of detecting objects, motion, weather, and/or the like), and/or the like. For example, reporting device 210 can include a camera (e.g., a visual spectrum imaging camera, an infrared or near infrared imaging camera, a multispectral imaging camera, a hyperspectral imaging camera, a thermal imaging camera, a laser mapping imagery camera, etc.), a speed detecting device (e.g., a radar detector), and/or the like. In some implementations, reporting device 210 can provide telematics data, accident data, and/or events data to telematics management platform 230.

Data storage device 220 includes one or more devices capable of receiving, storing, processing, and/or providing information associated with accident-prone zones. For example, data storage device 220 can include a server device or a group of server devices. In some implementations, data storage device 220 can include a first data storage device 220 for storing historical data (e.g., historical telematics data, historical accident data, and/or historical events data). Additionally, or alternatively, data storage device 220 can include a second data storage device 220 for storing data identifying geographic boundaries of accident-prone zones. In some cases, the first data storage device 220 and the second data storage device 220 can be the same data storage device 220. In some implementations, data storage device 220 can receive telematics data, accident data, and/or events data from reporting device 210 and/or telematics management platform 230. In some implementations, data storage device 220 can receive data identifying geographic boundaries of accident-prone zones from telematics management platform 230.

Telematics management platform 230 includes one or more devices capable of receiving, storing, generating, processing, and/or providing information associated with accident-prone zones. For example, telematics management platform 230 can include a server device (e.g., a host server, a web server, an application server, etc.), a data center device, or a similar device. In some implementations, telematics management platform 230 can provide an alert to reporting device 210 (e.g., a vehicle) indicating that reporting device 210 (e.g., the vehicle) is in or approaching an accident-prone zone. In some implementations, telematics management platform 230 can interact with reporting device 210 and/or one or more other devices to perform a first group of actions associated with assisting reporting device 210 (e.g., the vehicle) in leaving or avoiding the accident-prone zone. Additionally, or alternatively, telematics management platform 230 can perform a second group of actions associated with improving safety within the accident-prone zone by interacting with one or more other devices, such as devices associated with law enforcement, devices associated with traffic management organizations or construction organizations, and/or the like.

In some implementations, as shown, telematics management platform 230 can be hosted in cloud computing environment 240. Notably, while implementations described herein describe telematics management platform 230 as being hosted in cloud computing environment 240, in some implementations, telematics management platform 230 might not be cloud-based (i.e., can be implemented outside of a cloud computing environment) or might be partially cloud-based.

Cloud computing environment 240 includes an environment that hosts telematics management platform 230. Cloud computing environment 240 can provide computation, software, data access, storage, and/or other services that do not require end-user knowledge of a physical location and configuration of system(s) and/or device(s) that host telematics management platform 230. As shown, cloud computing environment 240 can include a group of computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 can host telematics management platform 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that can be provided to or accessed by reporting device 210 and/or data storage device 220. Application 235-1 can eliminate a need to install and execute the software applications on reporting device 210 and/or data storage device 220. For example, application 235-1 can include software associated with telematics management platform 230 and/or any other software capable of being provided via cloud computing environment 240. In some implementations, one application 235-1 can send/receive information to/from one or more other applications 235-1, via virtual machine 235-2.

Virtual machine 235-2 includes a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program, and can support a single process. In some implementations, virtual machine 235-2 can execute on behalf of a user (e.g., reporting device 210, such as a vehicle or a user device associated with the vehicle), and can manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
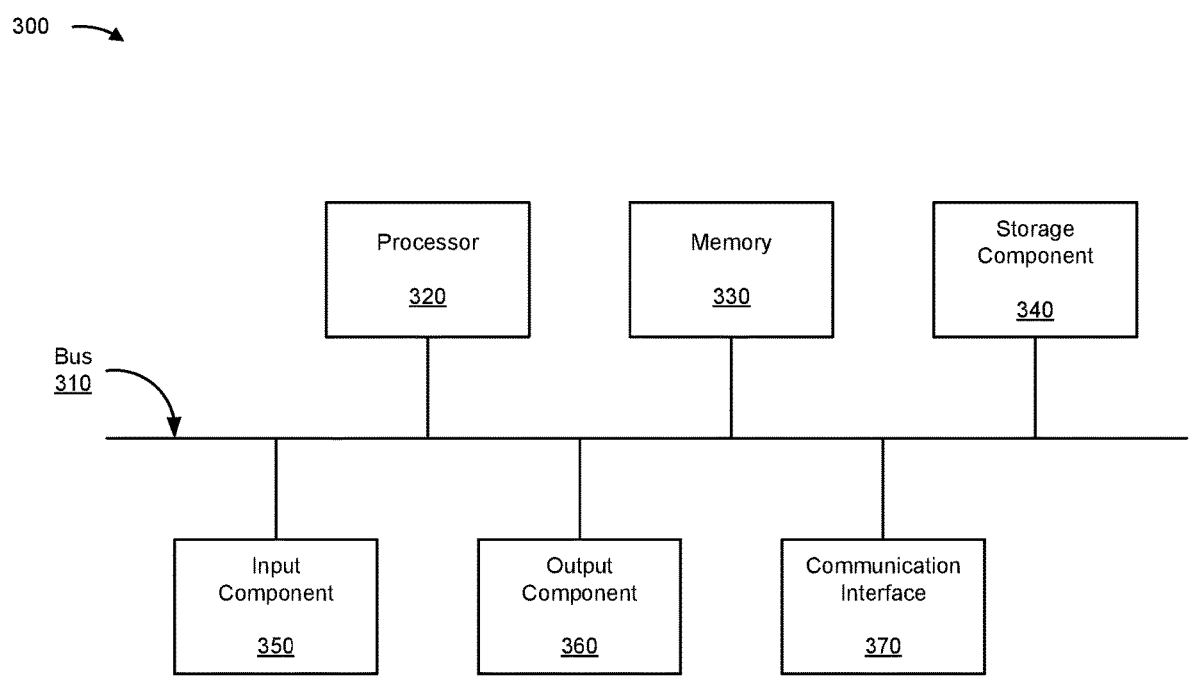
FIG. 3 is a diagram of example components of one or more devices of FIG. 2.

FIG. 3 is a diagram of example components of a device 300. Device 300 can correspond reporting device 210, data storage device 220, and/or telematics management platform 230. In some implementations, reporting device 210, data storage device 220, and/or telematics management platform 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
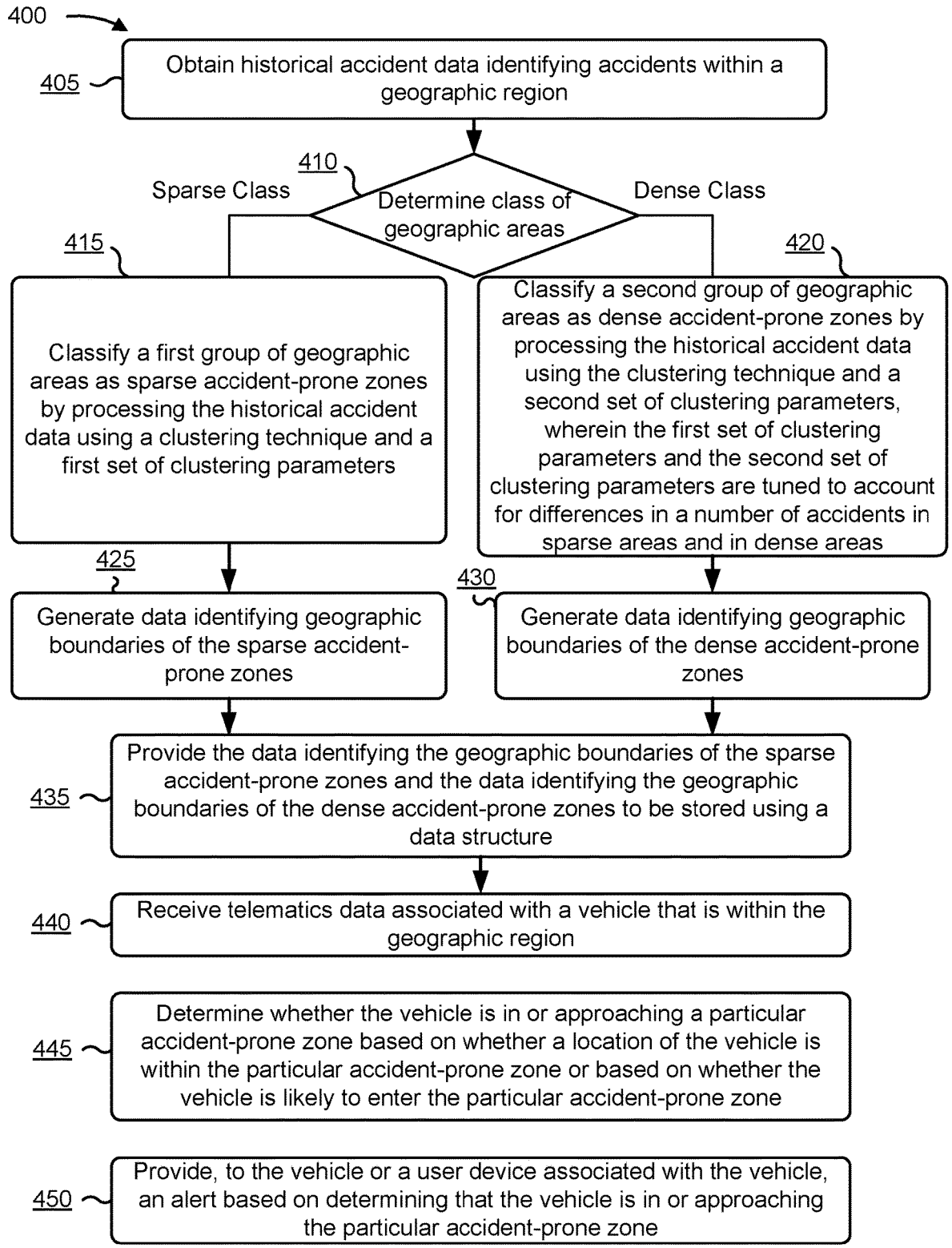
FIG. 4 is a flow chart of an example process for generating and providing an alert indicating that a vehicle is in or approaching an accident-prone zone.

FIG. 4 is a flow chart of an example process 400 for generating and providing an alert indicating that a vehicle is in or approaching an accident-prone zone. In some implementations, one or more process blocks of FIG. 4 can be performed by a telematics management platform (e.g., telematics management platform 230). In some implementations, one or more process blocks of FIG. 4 can be performed by another device or a group of devices separate from or including the telematics management platform, such as a group of reporting devices (e.g., a group of reporting devices 210) and/or a data storage device (e.g., data storage device 220).

As shown in FIG. 4, process 400 can include obtaining historical accident data identifying accidents within a geographic region (block 405). For example, the telematics management platform (e.g., using computing resource 235, processor 320, memory 330, input component 350, output component 360, communication interface 370, and/or the like) can obtain historical accident data identifying accidents within a geographic region, as described above in FIGS. 1A-1D.

As further shown in FIG. 4, process 400 can include classifying geographic areas within the geographic region (block 410). For example, the telematics management platform (e.g., using computing resource 235, processor 320, memory 330, input component 350, output component 360, communication interface 370, and/or the like) can classify geographic areas within the geographic region (e.g., into a sparse class, into a dense class, etc.), as described above in FIGS. 1A-1D.

As further shown in FIG. 4, process 400 can include classifying a first group of geographic areas as sparse accident-prone zones by processing the historical accident data using a clustering technique and a first set of clustering parameters (block 415). For example, the telematics management platform (e.g., using computing resource 235, processor 320, memory 330, and/or the like) can classify a first group of geographic areas as sparse accident-prone zones by processing the historical accident data using a clustering technique and a first set of clustering parameters, as described above in FIGS. 1A-1D.

As further shown in FIG. 4, process 400 can include classifying a second group of geographic areas as dense accident-prone zones by processing the historical accident data using the clustering technique and a second set of clustering parameters, wherein the first set of clustering parameters and the second set of clustering parameters are tuned to account for differences in a number of accidents in sparse areas and in dense areas (block 420). For example, the telematics management platform (e.g., computing resource 235, using processor 320, memory 330, and/or the like) can classify a second group of geographic areas as dense accident-prone zones by processing the historical accident data using the clustering technique and a second set of clustering parameters, as described above in FIGS. 1A-1D. In some implementations, the first set of clustering parameters and the second set of clustering parameters can be tuned to account for differences in a number of accidents in sparse areas and in dense areas.

As further shown in FIG. 4, process 400 can include generating data identifying geographic boundaries of the sparse accident-prone zones (block 425). For example, the telematics management platform (e.g., computing resource 235, using processor 320, memory 330, and/or the like) can generate data identifying geographic boundaries of the sparse accident-prone zones, as described above in FIGS. 1A-1D.

As further shown in FIG. 4, process 400 can include generating data identifying geographic boundaries of the dense accident-prone zones (block 430). For example, the telematics management platform (e.g., computing resource 235, using processor 320, memory 330, and/or the like) can generate data identifying geographic boundaries of the dense accident-prone zones, as described above in FIGS. 1A-1D.

As further shown in FIG. 4, process 400 can include providing the data identifying the geographic boundaries of the sparse accident-prone zones and the data identifying the geographic boundaries of the dense accident-prone zones to be stored using a data structure (block 435). For example, the telematics management platform (e.g., computing resource 235, using processor 320, memory 330, output component 360, communication interface 370, and/or the like) can provide the data identifying the geographic boundaries of the sparse accident-prone zones and the data identifying the geographic boundaries of the dense accident-prone zones to be stored using a data structure (e.g., a data structure associated with data storage device 220), as described above in FIGS. 1A-1D.

As further shown in FIG. 4, process 400 can include receiving telematics data associated with a vehicle that is within the geographic region (block 440). For example, the telematics management platform (e.g., computing resource 235, using processor 320, memory 330, input component 350, communication interface 370, and/or the like) can receive telematics data associated with a vehicle that is within the geographic region (e.g., from reporting device 210), as described above in FIGS. 1A-1D.

As further shown in FIG. 4, process 400 can include determining whether the vehicle is in or approaching a particular accident-prone zone based on whether a location of the vehicle is within the particular accident-prone zone or based on whether the vehicle is likely to enter the particular accident-prone zone (block 445). For example, the telematics management platform (e.g., computing resource 235, using processor 320, memory 330, and/or the like) can determine whether the vehicle is in or approaching a particular accident-prone zone based on whether a location of the vehicle is within the particular accident-prone zone or based on whether the vehicle is likely to enter the particular accident-prone zone, as described above in FIGS. 1A-1D.

As further shown in FIG. 4, process 400 can include providing, to the vehicle or a user device associated with the vehicle, an alert based on determining that the vehicle is in or approaching the particular accident-prone zone (block 450). For example, the telematics management platform (e.g., computing resource 235, using processor 320, memory 330, output component 360, communication interface 370, and/or the like) can provide, to the vehicle or a user device associated with the vehicle (e.g., reporting device 210), an alert based on determining that the vehicle is in or approaching the particular accident-prone zone, as described above in FIGS. 1A-1D.

Process 400 can include additional implementations, such as any single implementation or any combination of implementations described below and/or in connection with one or more other processes described elsewhere herein.

In some implementations, the telematics management platform can perform a first iteration of clustering as part of the clustering technique using a third set of clustering parameters to classify a third group of geographic areas as being the dense accident-prone zones. The third group of geographic areas can include the second group of geographic areas. In some implementations, the telematics management platform can perform a second iteration of clustering as part of the clustering technique using the second set of clustering parameters to classify a subset of the third group of geographic areas as being the dense accident-prone zones. The subset of the third group of geographic areas can be the second group of geographic areas.

In some implementations, the first set of clustering parameters and the second set of clustering parameters include tunable values that include at least one of: a first clustering parameter indicating a threshold number of accidents that must have occurred within a geographic area for the geographic area to be an accident-prone zone, or a second clustering parameter indicating that accidents will be considered as part of the accident-prone zone if the accidents are within a threshold distance of each other.

In some implementations, the sparse accident-prone zones and the dense accident-prone zones can be accident-prone zones. In some implementations, the telematics management platform can obtain historical telematics data for a group of vehicles that traveled within the geographic region. In some implementations, the telematics management platform can process the historical telematics data to identify geographic areas within the accident-prone zones that are more likely to have accidents when one or more accident indicators are present. In some implementations, the telematics management platform can generate data identifying geographic boundaries of one or more modified versions of the accident-prone zones based on whether at least one of the one or more accident indicators are present. In some implementations, when determining whether the vehicle is in or approaching the particular accident-prone zone, the telematics management platform can identify the particular accident-prone zone or a modified version of the particular accident-prone zone based on whether at least one of the one or more accident indicators are present. In some implementations, when determining whether the vehicle is in or approaching the particular accident-prone zone, the telematics management platform can determine whether the vehicle is in or approaching the particular accident-prone zone that has been identified or the modified version of the particular accident-prone zone that has been identified.

In some implementations, the sparse accident-prone zones and the dense accident-prone zones are accident-prone zones. In some implementations, the telematics management platform can classify one or more geographic areas within the accident-prone zones as being conditionally part of the accident-prone zones based on whether one or more accident indicators are present. In some implementations, when determining whether the vehicle is in or approaching the particular accident-prone zone, the telematics management platform can determine whether to include the one or more geographic areas as part of the accident-prone zones based on whether at least one of the one or more accident indicators are present. In some implementations, when determining whether the vehicle is in or approaching the particular accident-prone zone, the telematics management platform can determine whether the vehicle is in or approaching the particular accident-prone zone after determining whether to include the one or more geographic areas as part of the accident-prone zones.

In some implementations, the telematics management platform can provide, to the vehicle or to the user device, navigational instructions indicating how to leave or avoid the particular accident-prone zone based on determining that the vehicle is in or approaching the particular accident-prone zone.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    removing, by a device and based on historical data, a first group of geographical areas, within a geographical region, corresponding to a first group of accident-prone zones;
    identifying, by the device and based on the historical data and removing the first group of geographical areas, a second group of geographical areas, within the geographical region, as corresponding to a second group of accident-prone zones;
    receiving, by the device and based on identifying the second group of geographical areas, vehicle data associated with a vehicle that is driving within the geographical region;
    determining, by the device and based on receiving the vehicle data, that the vehicle is in or approaching a geographical area of the second group of geographical areas; and
    performing, by the device and based on determining that the vehicle is in or approaching the geographical area, one or more actions associated with assisting the vehicle in leaving or avoiding the geographical area.

2. The method of claim 1, wherein the historical data relates to at least one of accident data, telematics data, or events data.

3. The method of claim 1, wherein the vehicle data relates to at least one of telematics data or events data associated with the vehicle.

4. The method of claim 1, wherein the geographical area is associated with a threshold number of accidents.

5. The method of claim 1, wherein the second group of geographical areas is identified using a clustering technique.

6. The method of claim 5, wherein the clustering technique is a density-based spatial clustering of applications with a noise technique, a K-clustering technique, or a kernel density estimation technique.

7. The method of claim 5, wherein first group of accident-prone zones is a group of sparse accident-prone zones and the second group of accident-prone zones is a group of dense accident-prone zones.

8. The method of claim 7, further comprising:
identifying, based on the historical data and using a clustering technique and a first set of clustering parameters, the first group of geographical areas as corresponding to the second group of accident-prone zones; and,
wherein the first group of geographical areas is removed based on identifying the first group of geographical areas,
wherein the second group of geographical areas is further identified based on the historical data and using the clustering technique and a second set of clustering parameters.

9. The method of claim 8, wherein a first clustering parameter, of the first set of clustering parameters, corresponds to a first threshold for identifying the first group of geographical areas, and
wherein a second clustering parameter, of the second set of clustering parameters, corresponds to a second threshold, greater than the first threshold, for identifying the second group of geographical areas.

10. The method of claim 8, wherein each of the first set of clustering parameters and the second set of clustering parameters includes:
a first clustering parameter indicating a threshold number of accidents occurring within the geographical area, and
a second clustering parameter indicating a threshold distance between accidents for the accidents to be considered part of a same accident-prone zone.

11. The method of claim 1, wherein performing the one or more actions comprises:
providing, to the vehicle or a user device associated with the vehicle, an alert indicating that the vehicle is in or approaching the geographical area.

12. The method of claim 1, further comprising:
performing, based on determining that the vehicle is in or approaching the geographical area, one or more actions associated with improving safety within the geographical area.

13. The method of claim 1, wherein performing the one or more actions comprises at least one of:
generating instructions to be performed by the vehicle to avoid the geographical area;
using data identifying the geographical area to enhance road network data;
generating instructions to modify a state of a traffic light within the geographical area; or
generating recommended time intervals to permit traffic to flow in a particular direction.

14. A device, comprising:
one or more processors, coupled to one or more memories, to:
remove, based on historical data, a first group of geographical areas, within a geographical region, corresponding to a first group of accident-prone zones;
identify, based on the historical data and removing the first group of geographical areas, a second group of geographical areas, within the geographical region, as corresponding to a second group of accident-prone zones, respectively;
receive, based on identifying the second group of geographical areas, vehicle data for a vehicle that is driving within the geographical region;
determine, based on receiving the vehicle data, that the vehicle is in or approaching a geographical area of the second group of geographical areas; and
perform, based on determining that the vehicle is in or approaching the geographical area, one or more actions associated with at least one of assisting the vehicle in leaving or avoiding the geographical area or of improving safety within the geographical area.

15. The device of claim 14, wherein the one or more processors are further to:
identify, using a clustering technique and a first set of clustering parameters, the first group of geographical areas as corresponding to the first group of accident-prone zones,
wherein the first group of accident-prone zones is removed based on identifying the first group of geographical areas, and
wherein the second group of accident-prone zones is identified using the clustering technique and a second set of clustering parameters.

16. The device of claim 15, wherein the one or more processors are further to:
identify, using the clustering technique and a third set of clustering parameters, a subset of the second group of geographic areas as corresponding to the second group of accident-prone zones.

17. The device of claim 14, wherein the first group of accident-prone zones is a group of sparse accident-prone zones and the second group of accident-prone zones is a group of dense accident-prone zones.

18. The device of claim 14, wherein the one or more processors are further to:
reclassify, based on the historical data and identifying the second group of geographical areas an accident-prone zone of the second group of accident-prone zones as being part the first group of accident-prone zones,
wherein the vehicle data is received based on reclassifying the accident-prone zone.

19. The device of claim 14, wherein the one or more processors are to:
determine, based on the historical data, a set of accident indicators associated with the second group of geographical areas,
wherein the second group of geographical areas is further identified based on the set of accident indicators.

20. A non-transitory computer-readable medium storing one or more instructions, the one or more instructions comprising:
one or more instructions that, when executed by one or more processors, cause the one or more processors to:
remove, based on historical data, a first group of geographical areas, within a geographical region, corresponding to a first group of accident-prone zones;
identify, based on removing the first group of geographical areas, a second group of geographical areas, within the geographical region, as corresponding to a second group of accident-prone zones, receive, based on identifying the second group of geographical areas, vehicle data associated with a vehicle that is driving within the geographical region;

determine, based on receiving the vehicle data, that the vehicle is in or approaching a geographical area of the second group of geographical areas; and perform, based on determining that the vehicle is in or approaching the geographical area, one or more actions associated with at least one of assisting the vehicle in leaving or avoiding the geographical area or of improving safety within the geographical area.

* * * * *